United States Patent [19]

Sugao

[11] Patent Number: 4,893,601
[45] Date of Patent: Jan. 16, 1990

[54] MANIFOLD FOR CONVEYING A HIGH-PRESSURE FUEL

[75] Inventor: Keizo Sugao, Tagata, Japan

[73] Assignee: Usui Kokusai Sangyo Kaisha Ltd., Sunto, Japan

[21] Appl. No.: 182,102

[22] Filed: Apr. 15, 1988

[30] Foreign Application Priority Data

May 23, 1987 [JP] Japan .............................. 62-78009[U]

[51] Int. Cl.⁴ ........................................ F02M 35/00
[52] U.S. Cl. .................................. 123/468; 123/469; 285/329
[58] Field of Search ............... 123/468, 469, 470, 472; 285/329, 332, 332.2

[56] References Cited

U.S. PATENT DOCUMENTS

| | | | |
|---|---|---|---|
| 966,870 | 8/1910 | Stoddard | 285/329 |
| 1,987,372 | 1/1935 | Schellhammer | 285/329 |
| 2,098,669 | 11/1937 | Moffitt | 285/329 |
| 2,360,359 | 10/1944 | Meyers | 285/329 |
| 3,036,674 | 5/1962 | Branin | 285/329 |
| 3,437,357 | 4/1969 | Rubin | 285/329 |
| 3,783,842 | 1/1974 | Ruhn | 123/409 |
| 4,307,693 | 12/1981 | Giöckler | 123/469 |
| 4,519,368 | 5/1985 | Hudson | 123/470 |
| 4,540,205 | 9/1985 | Watanabe | 285/329 |
| 4,693,223 | 9/1987 | Eshlevy et al. | 123/470 |

FOREIGN PATENT DOCUMENTS

2334445 5/1974 Fed. Rep. of Germany ...... 123/469

*Primary Examiner*—Carl S. Miller
*Attorney, Agent, or Firm*—Anthony J. Casella; Gerald E. Hespos

[57] ABSTRACT

A manifold for conveying a high-pressure fuel comprises a main pipe having an axial bore and a plurality of ports formed through its wall, connected with the bore and spaced apart from one another along the length of the pipe, and a plurality of branch pipes each connected at one end thereof with one of the ports. The main pipe is provided with a plurality of short cylindrical projections extending laterally outwardly from its wall and each having an axial bore defining one of the ports. Each projection has an outer end provided with a conical or spherical surface, and an outer peripheral surface provided with a screw thread. Each branch pipe has a diametrically enlarged connecting head having a frustoconical or spherical surface closely fitting the conical or spherical surface of one of the projections. A cap nut surrounds each branch pipe and the corresponding main pipe projection and cooperates with the screw thread on the projection for holding the surface of the head against the conical or spherical surface of the projection.

8 Claims, 1 Drawing Sheet

PRIOR ART

4,893,601

MANIFOLD FOR CONVEYING A HIGH-PRESSURE FUEL

BACKGROUND OF THE INVENTION

1. Field of the Invention

This invention relates to a manifold which is provided near a diesel engine in a motor vehicle, etc. for supplying it with fuel having a high pressure, particularly an ultrahigh pressure in the order of at least 1000 kg/cm².

2Description of the Prior Art

A known manifold of the type to which this invention pertains is typically of the construction as shown in FIG. 3. It comprises a main pipe 11 having an axial bore 12 and a plurality of ports 13 formed through its wall, connected with the axial bore 12 and spaced apart from one another along the length of the pipe 11. A branch pipe 14 is fitted at one end thereof in each port 13 and is brazed or welded to the pipe 11 as shown at W. This manifold is, however, likely to present a serious drawback when it is repeatedly used for conveying fuel having a high pressure, especially an ultrahigh pressure which is as high as at least 1000 kg/cm². The embrittlement of the weldment W often occurs as a result of the repeated exposure of each branch pipe 14 to such a high pressure and also the vibration of the engine and results in the leakage of fuel or the separation of one or more branch pipes 14 from the main pipe 11.

SUMMARY OF THE INVENTION

It is, therefore, an object of this invention to provide a manifold which can withstand the ultrahigh pressure of fuel and the vibration of an engine so effectively as to be free from any possibility of fuel leakage through any pipe joint, or of the separation of any branch pipe from a main pipe, and which is also easy to assemble without requiring any welding work.

This object is attained by a manifold comprising a main pipe having an axial bore and a plurality of ports formed through its wall, connected with the axial bore and spaced apart from one another along the length of the pipe, and a plurality of branch pipes each connected at one end thereof with one of the ports, characterized in that the main pipe is provided with a plurality of short cylindrical projections extending laterally outwardly from its wall and each having an axial bore defining one of the ports, each of the projections having an outer end provided with a recessed surface, and an outer peripheral surface provided with a screw thread, each of the branch pipes having a diametrically enlarged connecting head closely fitting the recessed surface of one of the projections, and being provided with a nut cooperating with the screw thread for holding the head of the branch pipe against the projection.

The recessed end surface of each projection from the main pipe may be a conical or spherical surface, while the connecting head of each branch pipe may have a frustoconical or spherical surface.

The intimate contact of the surface of the head of each branch pipe with the end surface of the corresponding projection from the main pipe and the use of the nut for connecting each branch pipe with the corresponding projection enable the manifold to withstand a fuel pressure which is as high as at least 1000 kg/cm².

DETAILED DESCRIPTION OF THE INVENTION

Figure 1:
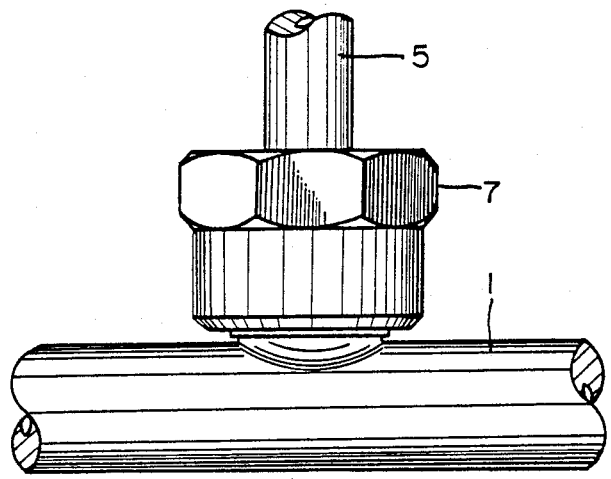
FIG. 1 is a side elevational view of a manifold embodying this invention.
Figure 2:
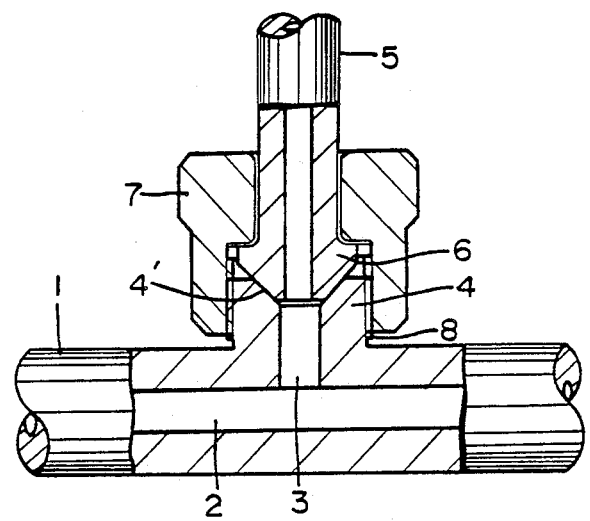
FIG. 2 is a cutaway view of the manifold shown in FIG. 1.

A manifold embodying this invention is fragmentarily shown in FIGS. 1 and 2. It comprises a main pipe 1 and a plurality of branch pipes 5, though only one branch pipe is shown. The main pipe 1 is a metal pipe having a relatively small outside diameter of, say, 20 mm and a relatively large wall thickness of, say, 6 mm. It has an axial bore 2. It has a plurality of short cylindrical projections 4 extending laterally outwardly from its wall and spaced apart from one another along the length of the pipe 1. Each projection 4 has an axial bore 3 connected with the axial bore 2 of the main pipe 1. The projections 4 can be formed by, for example, bulging by the pressure of a liquid. Each projection 4 has a radially outwardly spreading end surface 4'. The end surface 4' may be a conical or spherical surface.

Each branch pipe 5 is connected to one of the projections 4. Each branch pipe 5 has a diametrically enlarged connecting head 6. The head 6 has a frustoconical or spherical surface which is complementary to the end surface 4' of the corresponding projection 4 and contacts it intimately.

Each projection 4 has an outer peripheral surface provided with a screw thread 8. A cap nut 7 having a threaded inner peripheral surface is threadedly engaged with the screw thread 8 and surrounds each branch pipe 5 and the corresponding projection 4. The nut 7 holds the frustoconical or spherical surface of the head 6 against the end surface 4' of the projection 4.

Figure 2A:
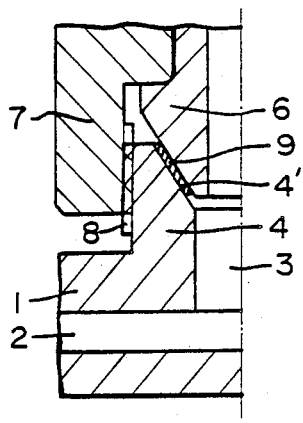
FIG. 2A is a fragmentary cutaway view of a manifold according to another embodiment of this invention.
Figure 3:
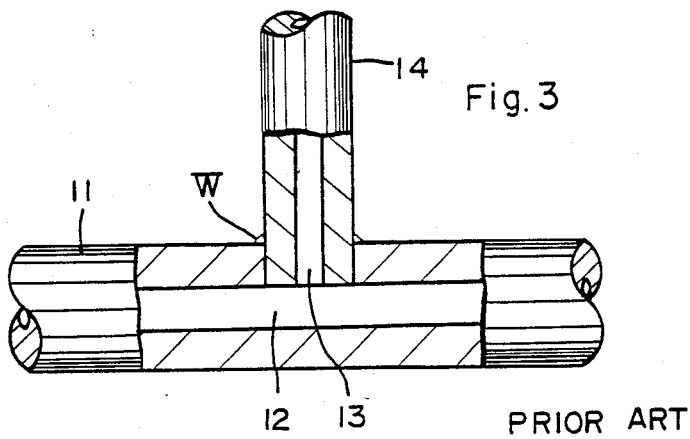
FIG. 3 is a view similar to FIG. 2, but showing the prior art.

A modified manifold is fragmentarily shown in FIG. 2A. It is substantially identical to the manifold shown in FIG. 2. The only difference therebetween is that the manifold of FIG. 2A includes a sealing member 9 interposed between the end surface 4' of each projection 4 and the surface of the head 6 of the corresponding branch pipe 5. The sealing member 9 may, for example, be a packing member formed from copper.

The manifold of this invention is easy to assemble, as the use of the nuts eliminates any and all brazing or welding work. The use of the nuts, the provision on the branch pipes of the diametrically enlarged heads held by the nuts against the main pipe projections and the intimate contact of the mutually complementary surfaces of the projections and the heads enable the manifold to withstand an ultrahigh fuel pressure without causing any fuel leakage or suffering from the separation of any branch pipe from the main pipe, even if it may be subjected to vibration repeatedly.

What is claimed is:

1. In a manifold for conveying a high-pressure fuel of at approximately 1000 kg/cm² comprising a metal main pipe having an outside diameter of approximately 20 mm and a wall thickness of approximately 6 mm, said main pipe having an axial bore and a plurality of ports formed through its wall, connected with said bore and spaced apart from one another along the length of said pipe, and a plurality of branch pipes each connected at one end thereof with one of said ports, the improvement wherein said main pipe is provided with a plurality of short cylindrical projections unitary with said main pipe and extending laterally outwardly from its wall and each having an axial bore defining one of said ports and a wall thickness approximately equal to the wall thickness of the main pipe, each of said projections having an outer end provided with a recessed surface, and an outer peripheral surface provided with a screw thread, and each of said branch pipes has a diametrically enlarged connecting head closely fitting said recessed surface of one of said projections and is provided with a nut cooperating with said screw thread for holding said head against said recessed surface.

2. A manifold as set forth in claim 1, wherein said nut is a cap nut.

3. A manifold as set forth in claim 2, wherein said recessed surface is a conical surface and said head has a frustoconical surface contacting said conical surface intimately.

4. A manifold as set forth in claim 2, wherein said recessed surface is a spherical surface and said head also has a spherical surface contacting it intimately.

5. A manifold as set forth in claim 3 further including a sealing member interposed between said recessed surface and said surface of said head.

6. A manifold as set forth in claim 5, wherein said sealing member is a packing member formed from copper.

7. A manifold as set forth in claim 1, wherein said projections are formed by bulging by the pressure of a liquid.

8. A manifold as set forth in claim 4, further including a sealing member interposed between said recessed surface and said surface of said head.

* * * * *